S. HICKMAN.
WHEELED HARROW.
APPLICATION FILED SEPT. 6, 1911.

1,015,956.

Patented Jan. 30, 1912.

2 SHEETS—SHEET 1.

Witnesses
C. W. Rippey
James R. Mansfield

Inventor
Samuel Hickman
Alexander & Powell
Attorneys

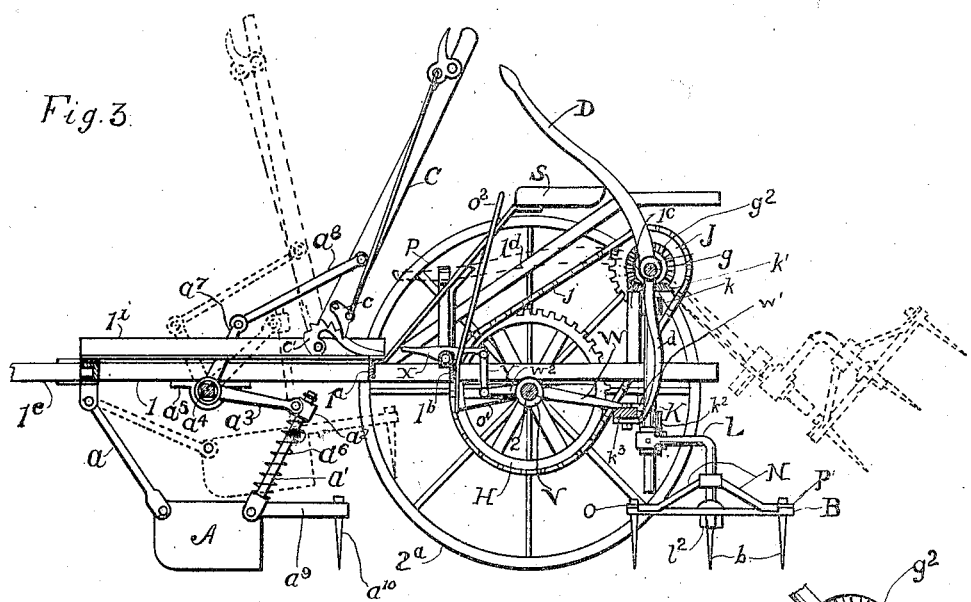

UNITED STATES PATENT OFFICE.

SAMUEL HICKMAN, OF SPRINGFIELD, OHIO.

WHEELED HARROW.

1,015,956.  Specification of Letters Patent.   Patented Jan. 30, 1912.

Application filed September 6, 1911. Serial No. 647,992.

*To all whom it may concern:*

Be it known that I, SAMUEL HICKMAN, of Springfield, in the county of Clark and State of Ohio, have invented certain new and useful Improvements in Wheeled Harrows; and I hereby declare that the following is a full, clear, and exact description thereof, reference being had to the accompanying drawings, which form part of this specification.

This invention is an improvement in wheeled harrows, or machines for preparing ground for seeding.

One of the objects of the invention is to provide a gyratory harrow adapted to pulverize the ground thoroughly as it is drawn thereover; the gyratory motion being imparted to the harrow simultaneously with its linear movement by suitable gearing actuated by the main carrying wheels of the machine.

A further object of the invention is to provide means in advance of the harrow for cutting and breaking large clods or sods preparatory to the pulverizing action of the harrow thereon.

The invention consists in novel features and combinations of parts more particularly set forth in the claims, and the invention will be clearly understood from the following explanation of the machine illustrated in the accompanying drawings forming part of this specification, and which will enable any one skilled in the art to design and construct machines embodying and operating upon the principle of the invention.

Figure 1:
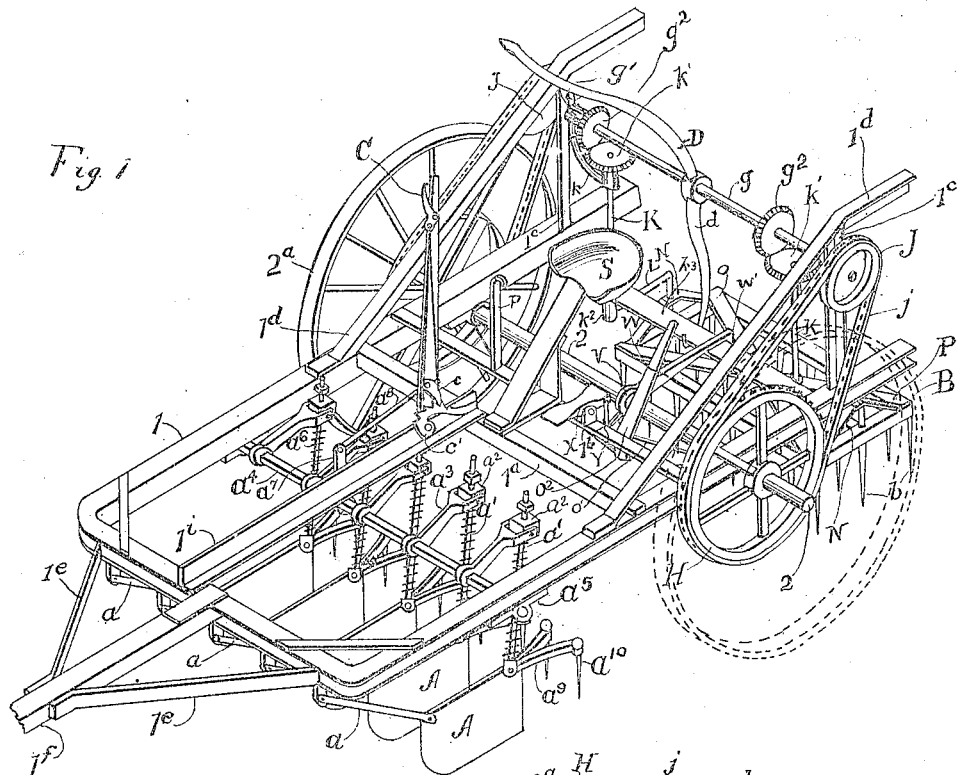
Figure 2:
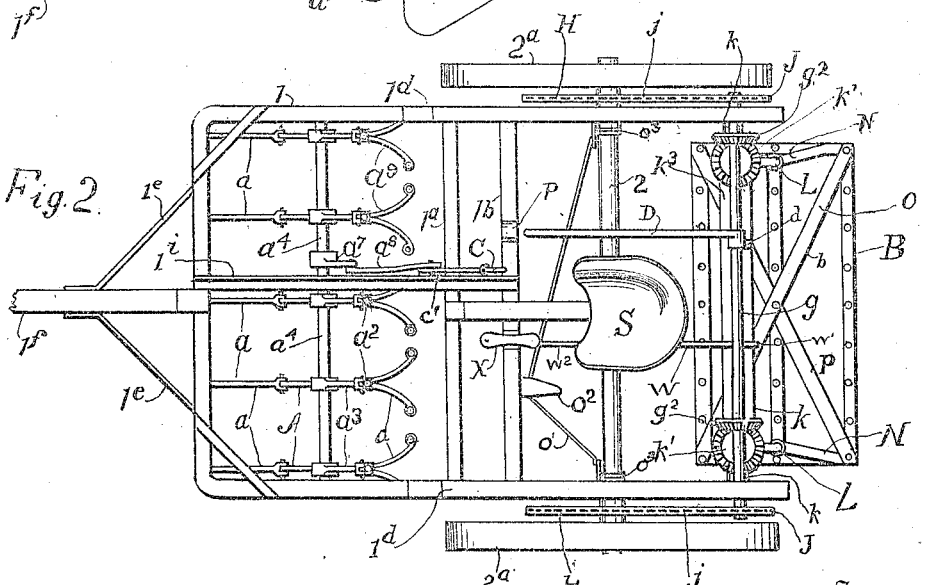

In said drawings—Figure 1 is a perspective view of a complete machine embodying the several features of the invention, but not drawn to a scale. Fig. 2 is a top plan view thereof. Fig. 3 is a vertical longitudinal section thereof showing the harrow lowered in full lines and raised in dotted lines; also indicating the independent self-adjusting capability of the cutting blades. Fig. 4 is an enlarged perspective view of parts of the gyratory frame and connections. Figs. 5, 6 and 7 are details.

The machine embodies a main carrying frame of any suitable construction, supported on an axle 2 carried by wheels $2^a$. The main frame 1 is made of channel iron of suitable size, with cross ties $1^a$ and $1^b$, uprights $1^c$, and inclined brace bars $1^d$, which are preferably made of angle iron; and the tongue braces $1^e$ are preferably made of flat iron with a twist to add to their stiffness and prevent bending. This frame may be provided with any suitable means for attachment of the draft animals, a tongue $1^f$ being indicated in the drawings.

Pivotally attached to the front bar of the frame is a series of links $a$, the lower ends of which are pivotally connected to the upper forward ends of cutting blades A which are set edgewise and are preferably rounded at their forward lower corners and are sharpened on their front and bottom edges. To the rear or heel portion of each blade A is pivotally connected a rod $a'$ which rods extend upwardly through eyes $a^2$ in the ends of crank arms $a^3$ connected to a rock-shaft $a^4$ journaled in brackets $a^5$ attached to the sides of the main frame.

Springs $a^6$ are strung on rods $a'$ below crank arms $a^3$ and normally tend to depress the blades A but allow such blades to individually and independently swing upwardly if they meet any unyielding obstruction. By rocking shaft $a^4$ the whole series of blades A can be simultaneously raised or lowered.

The shaft $a^4$ may be rocked by any suitable means; as shown a crank arm $a^7$ thereon is connected by a link $a^8$ to a lever C pivoted on a bar $1^i$ of the main frame and having a hand operated catch $c$ adapted to lock the lever to a segement $c'$ attached to said bar, as shown.

Attached to the rear upper edge of each blade A are rearwardly extending brackets $a^9$ to the rear ends of which are fastened depending harrow fingers $a^{10}$ which are adapted to break up the portions of the clods sliced by the blades and thus assist in preparing the ground for pulverization by the gyratory harrow. This much of the machine would be very efficient in preparing newly plowed ground for seeding and might be used in some cases to give a first dressing to the ground, particularly if the soil should be very damp or wet, before the harrow is used thereon. But when the ground is in proper condition the gyrating harrow immediately comes into operation in rear of the blades.

The clod cutters A can be varied in number in accordance with the size of machine, and are set about six inches apart and raised and lowered by lever C, which can be located and curved to suit the driver.

The harrow as shown comprises a frame B provided with teeth $b$ of any approved or preferred construction; and said frame is connected at its ends to cranks L attached to the lower ends of shafts K which are journaled in bearings in brackets $k$ that are shown as hung on a cross shaft $g$ journaled in bearing $g'$ attached to the standards $1^e$ of the frame, the arrangement being such that the shafts K with the harrow B can be swung upward and rearward away from the ground or lowered into operative contact therewith. In its lowermost position the harrow is in substantially the same horizontal plane as the series of blades A.

The crank shafts K are to be rotated simultaneously so as to impart a gyratory motion to the harrow; as shown the crank shafts K are provided with bevel gears $k'$ on their upper ends, meshing with bevel pinions $g^2$ on shaft $g$, and shaft $g$ may be driven by means of sprocket gears J and sprocket chains $j$ from sprocket gears H loosely mounted on axle 2 beside the wheels $2^a$ which may be locked to the hubs of the main carrying wheels $2^a$ by any suitable clutch device. In this way gyratory motion may be imparted to the harrow frame B.

The cranks L L operating the frame B are held in place by set-screws at any desired depth or height on the crank shafts K, K, and are held in the frame B by a nut $l^2$ beneath, turning in a snug boxing and steadied by braces N, N; the frame B being stayed in shape by cross braces O, P.

The brackets $k$ are loosely hung on shaft $g$; the bearings $k^2$ for the vertical crank shafts K are attached to a bar $k^3$ by which they are held in proper alinement. When the harrow is in its lowermost position this bar is engaged by a hook $w'$ on the end of a lever W which is fulcrumed on a sleeve V on the axle, and the forward arm $w^2$; and this lever is connected by a link Y to a foot treadle X adjacent the seat S. The bar $k^3$ is connected about centrally to one arm $d$ of the lever D that is loosely hung on the shaft G, and the other arm of the lever D extends within easy reach of the driver and can be depressed by hand so as to swing the brackets $k$, shaft K, and harrow frame B, rearwardly and upwardly to the position indicated in dotted lines in Fig. 3, and they may be held in this position by engaging lever D under catch P attached to the frame.

As shown each wheel $2^a$ is mounted to turn loosely upon a sleeve T which in turn is mounted upon the end of the axle 2. The hub of each wheel $2^a$ is provided with notches $w$ on its inner end, and the hub of the adjacent sprocket gear H is provided with longitudinal slots $h$ in which are slidably engaged keys $o$ attached to a ring O which is provided with a groove engaged by a collar R which may be hung on the axle, as shown, and by which the ring can be slid longitudinally on the axle to move the keys $o$ into or out of engagement with the notches $w$ in the hub of the adjacent wheel $2^a$.

When the keys are engaged with the notches the sprocket gear H are caused to rotate with the wheels $2^a$; and when the keys are disengaged from the notches the gears H can remain idle while the wheels $2^a$ rotate. The clutch rings $o^3$ may be simultaneously operated by means of links O' pivotally connected to a lever $O^2$ pivoted on the frame adjacent the driver's seat. By means of this lever $O^2$ the gyratory harrow may be thrown into and out of operation as may be required in operating the machine or stopping its action while turning in the field. Any suitable clutch devices may be used for this purpose. The harrow may be raised out of the way for transport, and held at different positions, by means of a lever D loosely hung on shaft $g$.

The dotted lines indicate the positions of the cutting blades A and gyrator B, when raised and not operating; the dog $c$ on the lever C holding it in place, and the hook P holding the lever D in place when it is forced down to raise the gyrator.

Operation: As the machine is drawn across the field or plowed ground the blades A sever the large clods and the fingers $a^{10}$ further break the same in advance of the harrow, which, owing to its gyratory motion and numerous teeth, thoroughly pulverizes the broken clods as the machine passes thereover, and reduces the soil to the best condition for planting; and owing to the gyratory motion of the harrow and its teeth the ground is thoroughly pulverized and not merely ridged or furrowed as it is by an ordinary drag-harrow. The machine is also useful in preparing corn-field ground for wheat, as the blades A will divide the stalks and trash in advance of the harrow. If any blade A strikes a rock or unyielding obstacle it can yield, owing to its spring mounting, and ride over such obstacle without affecting the others. In case of a large obstacle in the way, or during transportation and turning of the machine, the series of blades can be swung up out of the way; and the harrow can likewise be swung up out of the way for transportation, or to pass obstacles, whenever desired.

The invention is not restricted to the particular construction of parts illustrated in the drawings, particularly as relates to the means for vertically adjusting the harrow and for imparting gyratory movements thereto; and the clutch for engaging the carrying wheels and sprocket wheels; and these details may be varied from the construction shown to suit the designer or constructor while retaining the essential features of the invention.

I claim:

1. In combination, a wheeled frame, vertically disposed crank shafts thereon, a harrow, connections between the crank shafts and the harrow, and means for rotating said shafts to impart a gyratory movement to the harrow.

2. In combination, a wheeled frame, vertically disposed crank shafts thereon, a harrow hung on the cranks of said shafts, means for rotating said shafts to impart a gyratory movement to the harrow, and means for raising and lowering the harrow.

3. In a harrow, the combination of a wheeled frame, vertically disposed crank shafts mounted on said frame, gearing actuated from the carrying wheels for rotating said crank shafts, a harrow-frame connected to the cranks on said shafts, whereby gyratory motion is imparted to said harrow-frame and means for raising and lowering the harrow-frame.

4. In a harrow, the combination of a wheeled frame, swinging crank shafts mounted in said frame, gearing actuated from the carrying wheels for rotating said crank shafts, a harrow frame connected to the cranks on said shafts whereby gyratory motion is imparted to said harrow-frame and means for swinging the crank-shafts and harrow-frame to raise and lower the latter.

5. In a harrow, the combination of a main frame, adjustable swinging brackets mounted thereon, and vertically disposed shafts journaled in said brackets; gearing between the said shafts and the supporting wheels, cranks on said shafts, a harrow-frame suspended on said cranks and gyrated thereby and means for swinging said brackets to raise and lower the harrow-frame.

6. In combination a wheeled frame, and a gyratory harrow connected therewith; means for positively gyrating the harrow, and means for raising and lowering it.

In testimony that I claim the foregoing as my own, I affix my signature in presence of two witnesses.

SAMUEL HICKMAN.

Witnesses:
R. S. McIntire,
Junius F. Whiting.